US012112905B2

(12) United States Patent
Beecher et al.

(10) Patent No.: US 12,112,905 B2
(45) Date of Patent: Oct. 8, 2024

(54) ALTERNATIVE GAS CURRENT PAUSE CIRCUIT INTERRUPTER

(71) Applicant: Southern States, LLC, Hampton, GA (US)

(72) Inventors: Zachary Beecher, McDonough, GA (US); Teng Hu, Simpsonville, SC (US); Joseph R Rostron, McDonough, GA (US)

(73) Assignee: SOUTHERN STATES, LLC, Hampton, GA (US)

( * ) Notice: Subject to any disclaimer, the term of this patent is extended or adjusted under 35 U.S.C. 154(b) by 47 days.

(21) Appl. No.: 18/056,347

(22) Filed: Nov. 17, 2022

(65) Prior Publication Data

US 2024/0170240 A1 May 23, 2024

(51) Int. Cl.
*H01H 33/02* (2006.01)
*H01H 3/42* (2006.01)
*H01H 33/42* (2006.01)
*H01H 33/56* (2006.01)
*H01H 33/64* (2006.01)

(52) U.S. Cl.
CPC .......... *H01H 33/64* (2013.01); *H01H 33/025* (2013.01); *H01H 33/42* (2013.01); *H01H 33/56* (2013.01)

(58) Field of Classification Search
CPC .... H01H 33/64; H01H 33/025; H01H 33/028; H01H 33/12; H01H 33/122; H01H 33/123; H01H 33/16; H01H 33/161; H01H 33/167; H01H 33/168; H01H 33/42; H01H 33/56; H01H 2033/028; H01H 2033/146; H01H 2033/566; H02H 9/08; G05F 1/00
USPC ..... 218/89, 8, 14, 21, 47, 92, 102, 115, 143, 218/144, 145; 361/8–11, 13; 315/199; 200/144 AP
See application file for complete search history.

(56) References Cited

U.S. PATENT DOCUMENTS 4,434,332 A * 2/1984 Yanabu ................ H01H 33/143 218/144
4,439,651 A * 3/1984 Thuries ................ H01H 33/168 218/143
4,489,291 A * 12/1984 Toyoda .................... H01C 7/18 338/215

(Continued)

*Primary Examiner* — William A Bolton
(74) *Attorney, Agent, or Firm* — Mehrman Law Office; Michael J. Mehrman

(57) ABSTRACT

An alternative gas current pause circuit interrupter with an internally switched resistor-varistor impedance. The varistor limits the voltage rise across the main contactor limiting restrikes, while the resistor limits the current through the interrupter. The values of the resistor and varistor are selected to creates a current pause in the current. In a representative embodiment, the current pause performance is less than 10% of the rated line current for at least 15% of the half-cycle period allowing a plain break butt impedance contactor to be utilized without excessive arcing. For another embodiment the current pause performance is less than 5% of the rated line current for at least 20% of the half-cycle period. SF6 free alternative gas current pause circuit interrupters using a 60% CO2 blend can achieve similar or improved transient voltage performance compared to similarly sized conventional SF6 gas interrupters operating at the same voltage rating.

20 Claims, 10 Drawing Sheets

(56) References Cited

U.S. PATENT DOCUMENTS

| | | | | |
|---|---|---|---|---|
| 4,608,470 | A * | 8/1986 | Bischofberger | H01H 33/166 218/143 |
| 4,788,390 | A * | 11/1988 | Crino | H01H 33/16 218/143 |
| 5,170,023 | A * | 12/1992 | Pham | H01H 33/161 218/143 |
| 5,225,642 | A * | 7/1993 | Yamamoto | H01H 33/122 218/143 |
| 5,241,294 | A | 8/1993 | Pham et al. | |
| 5,245,145 | A * | 9/1993 | Freeman | H01H 33/166 338/20 |
| 5,262,605 | A | 11/1993 | Pham et al. | |
| 5,264,671 | A | 11/1993 | Pham et al. | |
| 5,266,758 | A | 11/1993 | Pham et al. | |
| 5,276,285 | A | 1/1994 | Pham et al. | |
| 5,728,989 | A * | 3/1998 | Utsumi | H01H 33/165 218/145 |
| 6,072,673 | A * | 6/2000 | Chen | H01H 33/123 361/13 |
| 6,583,978 | B2 | 6/2003 | Rostron et al. | |
| 7,078,643 | B2 | 7/2006 | Rostron et al. | |
| 7,476,823 | B2 | 1/2009 | Rostron | |
| 8,426,760 | B2 * | 4/2013 | Holaus | H01H 33/16 218/78 |
| 8,890,019 | B2 * | 11/2014 | Faulkner | H01H 33/16 218/143 |
| 2021/0202195 | A1 * | 7/2021 | Berner | H01H 33/82 |

* cited by examiner

ALTERNATIVE GAS CURRENT PAUSE CIRCUIT INTERRUPTER

TECHNICAL FIELD

The present invention is directed to electric power systems and, more particularly, to an alternative gas current pause circuit interrupter with an internally switched resistor-varistor.

BACKGROUND OF THE INVENTION

Electric components in open-air switches have been utilized to reduce current spikes occurring in blade-type disconnect switches. For example, U.S. Pat. No. 7,476,823 is incorporated by reference. This patent describes a current pause device for an electric power circuit interrupter including an insulator and a diode built into an arcing horn in a disconnect blade jaws. This approach is only suitable for relatively low voltage switches utilizing blade-type disconnect switches with arcing horns deployed in open air. Other types of circuit interrupters utilize enclosed contactors where this approach is not applicable.

Gas circuit interrupters with switches located inside sealed containers filled with a dielectric gas have been in use for decades. An example of this type of device is shown in U.S. Pat. No. 6,583,978, which is incorporated by reference. In general, a spring-driven toggle mechanism accelerates a contactor inside the dielectric gas container to open and close a high voltage electric power switch. The basic design challenge for a circuit interrupter with an internal contactor involves engineering an acceleration mechanism that obtains the desired contractor velocity quickly enough to extinguish the arc without experiencing an undesired restrike across the contactor or flashover to a location other than across the contactor. Metal oxide varistors have been incorporated into impedance blocks inserted into the circuit during switching to limit the voltage rise across the contactor to mitigate restrikes and flashover. See, for example, U.S. Pat. No. 5,276,285, which is incorporated by reference. This patent describes resistor and varistor blocks incorporated into sulfur hexafluoride (SF6) gas interrupters where the high dielectric performance of the SF6 dielectric gas limits the size, required contactor acceleration, and flashover characteristics of the interrupter.

The arcs formed within gas circuit interrupters, which can occur each half-cycle, are usually extinguished within one or two electric power half-cycles (about 17 msec at 60 Hz; about 20 msec at 50 Hz) to limit the restrike voltage. In a "plain break" type switch, the dielectric gas is not forced into the arc gap during switch operation. In a more complex "puffer" type switch, the actuator that drives the electric contacts directs a flow of the dielectric gas into the arc gap between the electric contacts to insulate and absorb the energy of the arcing plasma through ionization of the dielectric gas. This can be conceptualized as "puffing" the dielectric gas into the arc gap to help "blow out" the arc that forms between the electric contacts. Flowing the dielectric gas into the arc gap allows the arcing contacts to achieve superior arc interrupting performance at an economical manufactured cost.

Although SF6 is a very effective dielectric gas for arcing electric power switches, it is also a very potent greenhouse gas estimated to be over 20,000 more effective than carbon dioxide (CO2) as a potential global warming greenhouse agent. Even a small amount of SF6 gas released into the atmosphere can therefore have significant negative environmental consequences. To mitigate this potential environmental impact, cost effective alternatives to SF6 gas are needed for high voltage electric power switches. For example, pure vacuum and alternative dielectric gasses, such as carbon dioxide, have been used as dielectric gasses in circuit interrupters. But vacuum switches are rather costly at high voltages, and they are very sensitive to even small amounts of metallic vapors contaminating the vacuum. In general, utilizing a less effective dielectric gas generally imposes the tradeoff of increasing the size, required contactor acceleration, and cost of the switch. All known alternative dielectric gasses exhibit dielectric performance significantly inferior to SF6, which significantly increases the required size, contactor acceleration and cost of the interrupter.

While it would be environmentally preferable to replace the SF6 gas with a more environmentally friendly gas, the small size and flashover characteristics of the conventional SF6 gas interrupters rely on the high dielectric performance of SF6. Simply replacing the SF6 with a less effective dielectric gas would cause undesirable restrikes, flashover and transient disturbances. While the entire circuit interrupter could theoretically be increased in size and contactor acceleration to accommodate a less effective dielectric gas, the result would be an untenable increase in the cost of the device. With millions of these devices in service, the electric utility industry continues to have a need for more cost-effective solutions for gas interrupters replacing SF6 with a more environmentally friendly alternative dielectric gas.

SUMMARY THE INVENTION

The invention may be embodied in an alternative gas current pause circuit interrupter with an internally switched resistor-varistor impedance. The varistor limits the voltage rise across the main contactor limiting restrikes, while the resistor limits the current through the interrupter. The values of the resistor and varistor are selected to create a current pause in the current flowing through the interrupter, which allows a plain break butt impedance contactor to be utilized. In a representative embodiment, the current pause performance is less than 10% of the rated line current for at least 15% of the half-cycle period allowing a plain break impedance contactor to operate without excessive arcing. For another embodiment, the current pause performance is less than 5% of the rated line current for at least 20% of the half-cycle period. The innovative design allows the circuit interrupter to utilize a more environmentally friendly alternative dielectric gas, such as a carbon dioxide blend, with a dielectric performance significantly below SF6.

A representative embodiment includes an electric power circuit interrupter for a power line conducting electricity characterized by a rated voltage, a rated current, and a half-cycle period. The circuit interrupter includes an insulator that includes a container filled with a dielectric gas excluding sulfur hexafluoride. The insulator houses an electric power switch including a main contactor and an impedance contactor. Terminals connect the electricity from the power line through the electric power switch. A cap positioned adjacent to an end of the insulator houses a resistor and a varistor with the impedance contactor, the resistor, and the varistor electrically connected in series forming a shunt leg electrically connected in parallel with a main contactor leg. An actuator drives the electric power switch through an opening stroke to open the main contactor before the impedance contactor to disconnect the electricity flowing through the electric power switch. The opening stroke causes at most two current restrikes to occur across the main contactor followed by a current pause in the shunt leg exhibiting an electric current less than 10% of the rated current for a duration of at least 15% of the half-cycle period.

In other representative embodiments, the current pause exhibits an electric current less than 5% for a duration of at least 20% of the half-cycle period. The dielectric gas may include at least 60% carbon dioxide. The main contactor may be a puffer type pin-and-tulip penetrating contactor and the impedance contactor may be a plain break butt type contactor. The resistor may include a number of resistor disks positioned around a common core, while the varistor includes a number of zinc oxide disks positioned around the same core. The circuit interrupter may also include a plunger and spring biasing the resistor and varistor disks against the end of the cap to ensure tight electrical connection between the disks and the cap.

In a representative embodiment, a voltage disturbance less than the rated voltage follows current interruption. In another representative embodiment, the voltage disturbance is less than 10% of the rated voltage. SF6 free alternative gas current pause circuit interrupters using a 60% CO2 blend can achieve similar or improved transient voltage performance compared to similarly sized conventional SF6 gas interrupters operating at the same voltage rating.

It will be understood that specific embodiments may include a variety of features in different combinations, as desired by different users. The specific techniques and structures for implementing particular embodiments of the invention and accomplishing the associated advantages will become apparent from the following detailed description of the embodiments and the appended drawings and claims.

BRIEF DESCRIPTION OF THE FIGURES

The numerous advantages of the invention may be better understood with reference to the accompanying figures in which.

DETAILED DESCRIPTION

The invention may be embodied in an alternative gas current pause circuit interrupter with a stack of internally switched resistor and varistor disks located in a cap adjacent to a puffer type pin-and-tulip penetrating main contactor. In addition to the puffer type main contactor, the circuit interrupter includes a plain break butt type impedance contactor that switches the resistor-varistor stack in and out of the current path during spring-actuated operation of the main contactor. The varistor limits the voltage across the main contactor while the resistor limits the current through the impedance contactor. The resistor and varistor disks are selected to allow the main contactor to interrupt the current flowing through the main contactor with at most two restrikes, while allowing a plain break butt type impedance contactor to interrupt the current in the impedance contactor without excessive arcing.

The interrupter generates an extended current pause sufficient to allow an alternative gas with a significantly lower dielectric performance than SF6 to recover from the initial restrikes. The current pause is sufficient to allow a plain break butt type impedance contactor to be utilized without experiencing excessive arcing. In a representative embodiment, the resistor-varistor stack is selected to produce a current pause of less than 10% of the rated current for duration of at least 15% of the electric power half-cycle. In some cases, the current pause can be less than 5% of the rated current for more than 20% of the electric power half-cycle. The alternative gas, typically a CO2 blend, is much less environmentally damaging than the conventional SF6 gas, which is an extremely potent greenhouse gas. In a representative embodiment, the alternative dielectric gas contains at least 60% CO2, and may also include O2 and N2 components. The alternative gas current pause circuit interrupters can achieve similar or improved transient voltage performance compared to similarly sized conventional SF6 gas interrupters operating at the same voltage rating.

Figure 1:
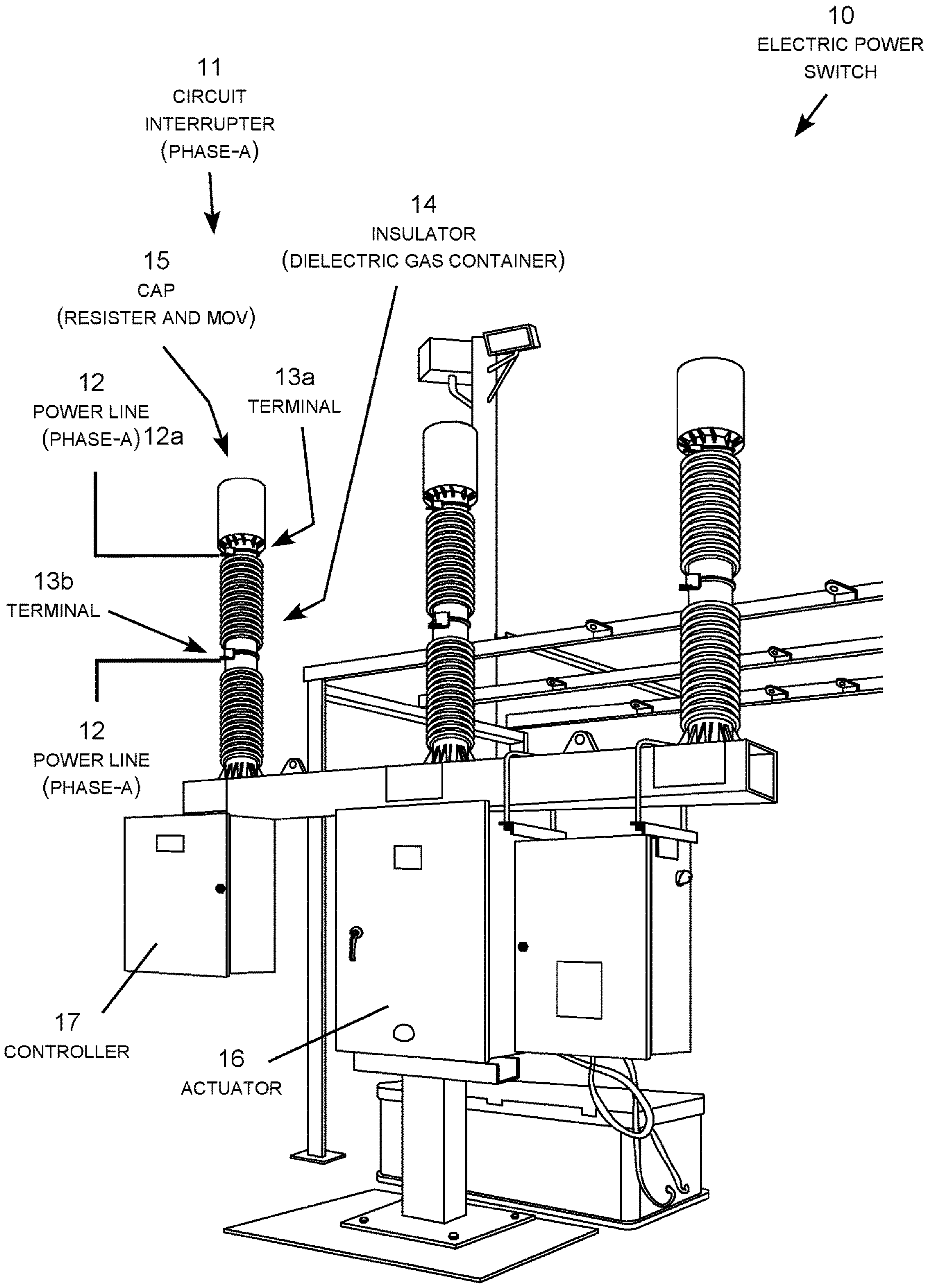
FIG. 1 is conceptual side view of an alternative gas current pause circuit interrupter with an internally switched resistor-varistors.

FIG. 1 is conceptual side view of a three-phase electric power switch 10 that includes three alternative gas current pause circuit interrupters, one for each electric power phase conductor. Since the phase interrupters are identical, only one representative phase circuit interrupter 11 is described in detail. The circuit interrupter 11 switches the electric power flowing on a power line phase conductor 12 through the interrupter between the power line terminals 13_a_ and 13_b_. The electric current flows through a switching device located within a hollow insulator 14, which also serves as a sealed dielectric gas container containing a main contactor and an impedance contactor within an alternative dielectric gas, such as a CO2 blend containing at least 60% CO2. In this example embodiment, the circuit interrupter 11 includes a number of internally switched resistor and varistors disks located in a cap 15 that are switched into and out of the current flow during the operation of the main contactor to avoid undesired restrikes or flashover within the insulator 14. The circuit interrupter 11 is operated by an actuator 16 controlled by a controller 17, which may be located locally or remotely from the electric power switch 10.

Figure 2A:
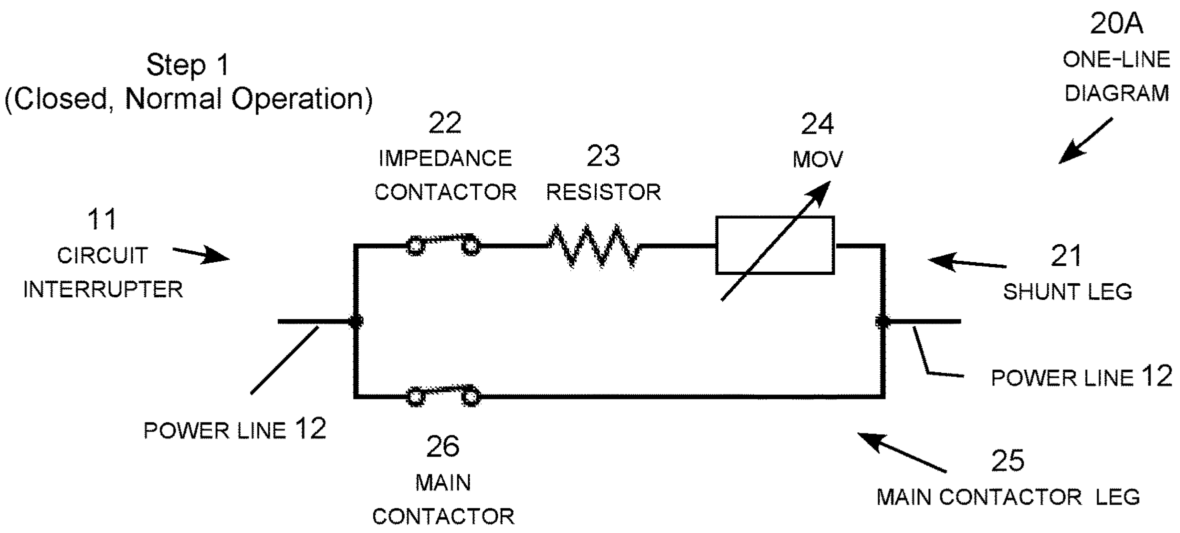
FIG. 2A is an electrical one-line diagram illustrating a normally closed alternative gas current pause circuit interrupter as in a closed normal operating configuration.

FIG. 2A is an electrical one-line diagram 20A illustrating a normally closed alternative gas current pause circuit interrupter 11 in the closed, normal operating configuration. The interrupter 11, which is connected inline along the powerline 12, includes a shunt leg 21 including an impedance contactor 22, a resistor 23, and a metal oxide varistor (MOV) 24 connected in series. The shunt leg 21 is electrically connected in parallel with a main contactor leg 25 containing the main contact 26. In this particular embodiment, the impedance contactor 22 is a "plain break" butt type contactor, while the main contactor 26 is a pin-and-tulip "puffer" type penetrating contactor. FIG. 2A shows the circuit interrupter 11 in its closed, normal operation configuration for an inline circuit interrupter with the main contactor 26 and the impedance contactor 22 both closed.

Figure 2B:
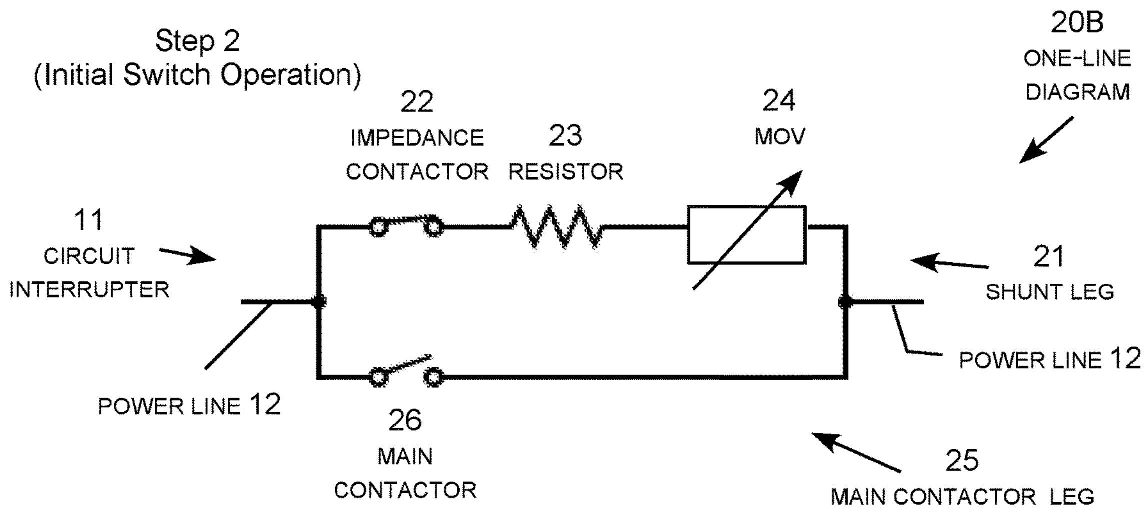
FIG. 2B is an electrical one-line diagram illustrating the normally closed alternative gas current pause circuit interrupter in an initial switched configuration.

FIG. 2B is an electrical one-line diagram 20B illustrating the normally closed alternative gas current pause circuit interrupter 11 in an initial switched configuration, in which the main contactor 26 has opened momentarily before the impedance contactor 22. This directs the current through the shunt leg 21, where the MOV 24 limits the voltage across the main contactor 26 sufficiently to allow the puffer type penetrating main contactor to extinguish the arc between the main contacts with at most two restrikes utilizing the alternative gas with a lower dielectric performance than the conventional SF6 gas used in this type of gas circuit interrupter.

Figure 2C:
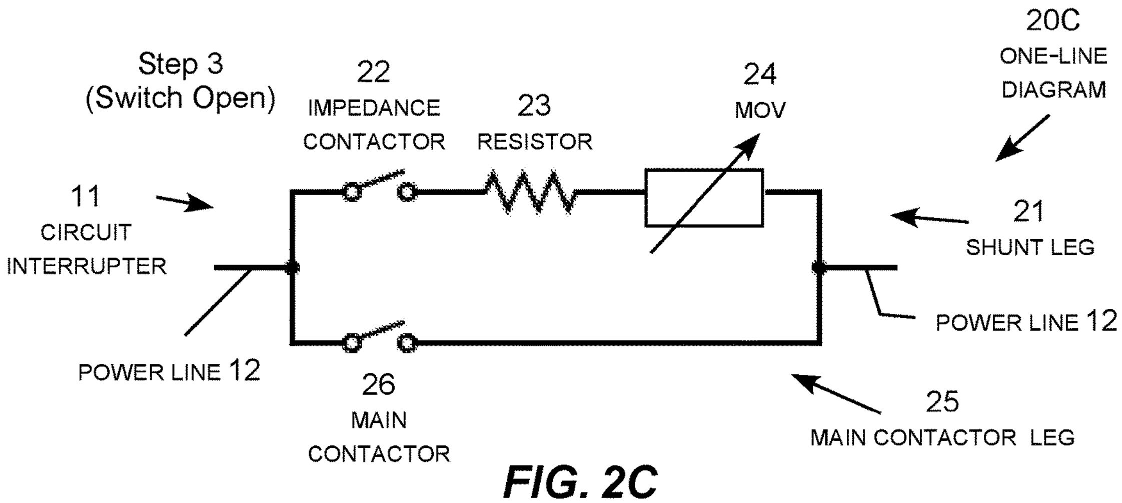
FIG. 2C is an electrical one-line diagram illustrating the normally closed alternative gas current pause circuit interrupter in an open configuration.

FIG. 2C is an electrical one-line diagram 20C illustrating the normally closed alternative gas current pause circuit interrupter 11 in an open configuration, in which the main contactor 26 and the impedance contactor 22 are both open. After the main contactor 26 opens, the resistor 23 limits the current through the shunt leg 21 allowing the impedance contactor 22 to open with very low current flowing, typically less than 20% of the rated line current. This allows the plain break butt impedance contactor to interrupt the current in the shunt leg without experiencing excessive arcing.

Strategic selection of values of the resistor 23 and the MOV 24 generates an extended current pause in the shunt leg 21, which limits the current in the impedance contactor 22 to less than 10% of the rated current for at least 15% of the half-cycle period, and in many cases less than 5% of the rated current for a least 20% of the half-cycle period. This allows a butt type plain break contactor to experience acceptable arcing in a lower dielectric gas environment, allowing the circuit interrupter to utilize a more environmentally friendly alternative gas, such as a CO2 blend, instead of SF6. In addition, the voltage limitation caused by the resistor-varistor allows the main contactor to extinguish the current with at most two restrikes without significantly increasing the size or contactor acceleration of the interrupter despite utilization of an alternative dielectric gas with a significantly lower dielectric performance in comparison to similarly sized conventional SF6 gas circuit interrupters.

Figure 3:
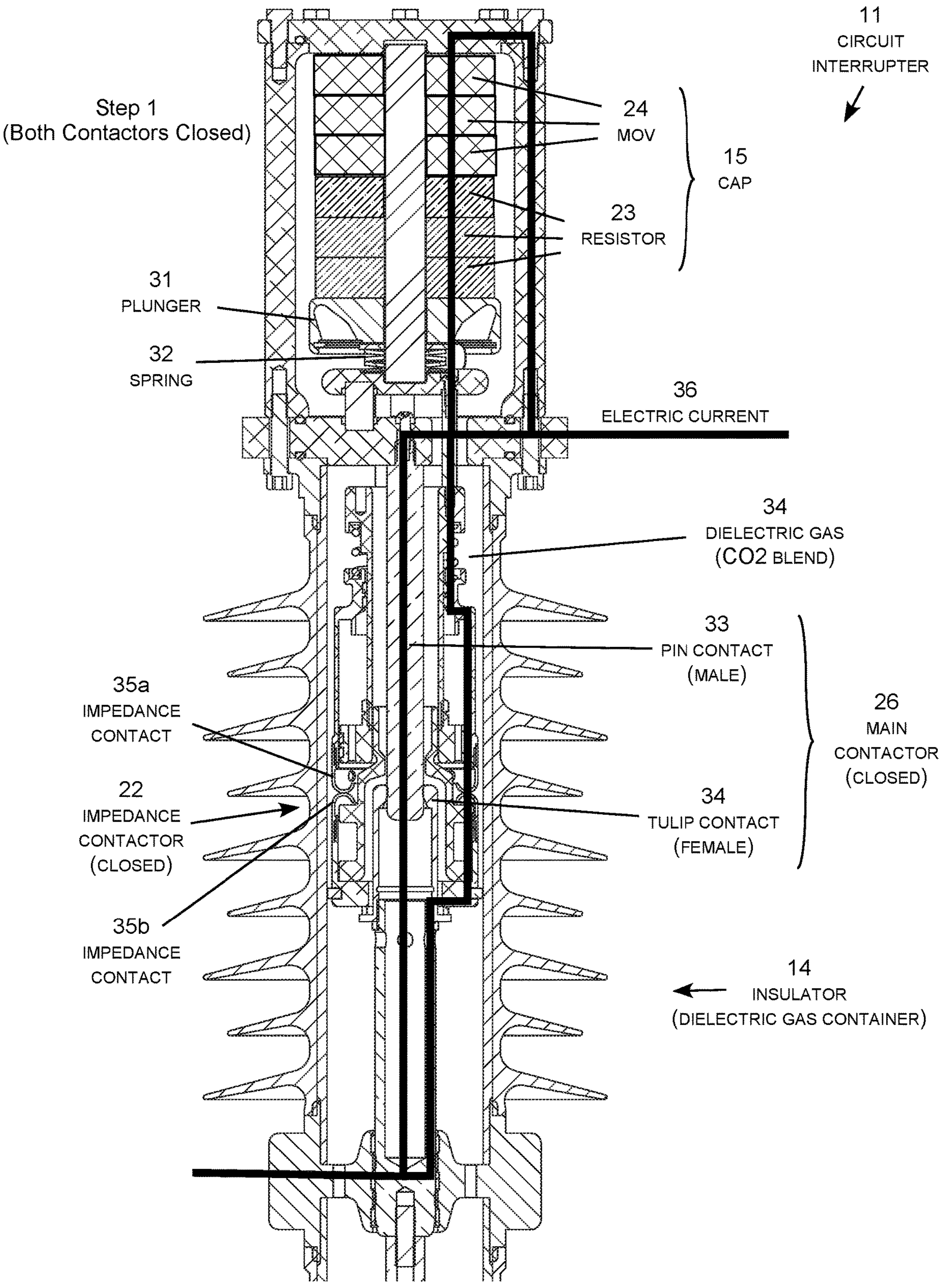
FIG. 3 is a cut-away side view showing the current path through the alternative gas current pause circuit interrupter in the closed normal operating configuration.

FIG. 3 is a cut-away side view showing the current path through an illustrative embodiment of the normally closed alternative gas current pause circuit interrupter 11 in the closed configuration. This configuration corresponds to the one-line diagram 20A shown in FIG. 2A, in which the impedance contactor 22 and the main contactor 26 are both closed. In this particular embodiment, the resistor 23 and the MOV 24 are located in the cap 15 and formed as disks (also called pucks) stacked on a common core, where they are in firm electric contact with each other and the cap 15. A plunger 31 and spring 32 bias the stack against the end of the cap 15 to ensure tight electrical contact between the disks and the cap. The main contactor 26 is a "puffer" type contactor including a fixed pin (male) contact 33 and a moving tulip (female) contact 34 forming an arc gap during opening and closing of the main contactor. The impedance contactor 22 includes plain break butt contacts 35*a* and 35*b*, which may have a continuous ring, segmented ring, multiple probe, or single probe shape. There is considerable flexibility in the design of the impedance contactor due to the extended current pause when opening the impedance contactor.

With the impedance contactor 22 and the main contactor 26 both closed, the electric current 36 flows through the resistor-varistor stack 23, 24, the cap 15, and the impedance contactor 22 (shunt leg 21) in parallel with the main contactor 26 (main contactor leg 25). When both switches 22, 26 are closed, however, there is very low resistance in the main contactor leg 25 compared to the shunt leg 21. In addition, the MOV 24 operates as a voltage "clamp" in a non-conductive mode with a very high resistance until the clamp voltage (also referred to as the "breakdown" or "clipping" voltage") is reached. Once the clipping voltage is reached, the MOV 24 switches to a conducting mode with a much lower resistance, which effectively limits the voltage rise across the main contactor 26. The resistor 23 and MOV 24 prevent all but a negligible amount of current from flowing through the shunt leg 21 while the main contactor 26 is closed. Once the main contactor 26 interrupts the current flowing in the main contactor leg 26, the line voltage appears across the shunt leg 21 and the still separating main contactor 26. Until the voltage across the MOV 24 reaches its clipping voltage, it remains in a non-conductive mode blocking the current from flowing through the shunt leg 21. Once the voltage across the MOV reaches the clipping voltage, it switches to a conductive mode allowing current to flow through the shunt leg 21 and effectively limiting the voltage rise across the main contactor 26 to prevent another restrike. The dielectric performance of the alternate gas comes into play, where better dielectric performance helps to prevent an undesired restrike across the main contactor 26. After the MOV switches to a conductive mode, the resistor 23 limits the current through the shunt leg 21, which limits the arcing across the impedance contactor 22. The dielectric performance of the alternate gas comes into play again, where better dielectric performance helps to limit the arcing and transient voltage disturbance that occurs as the electric current is interrupted by the impedance contactor 22.

Figure 4:
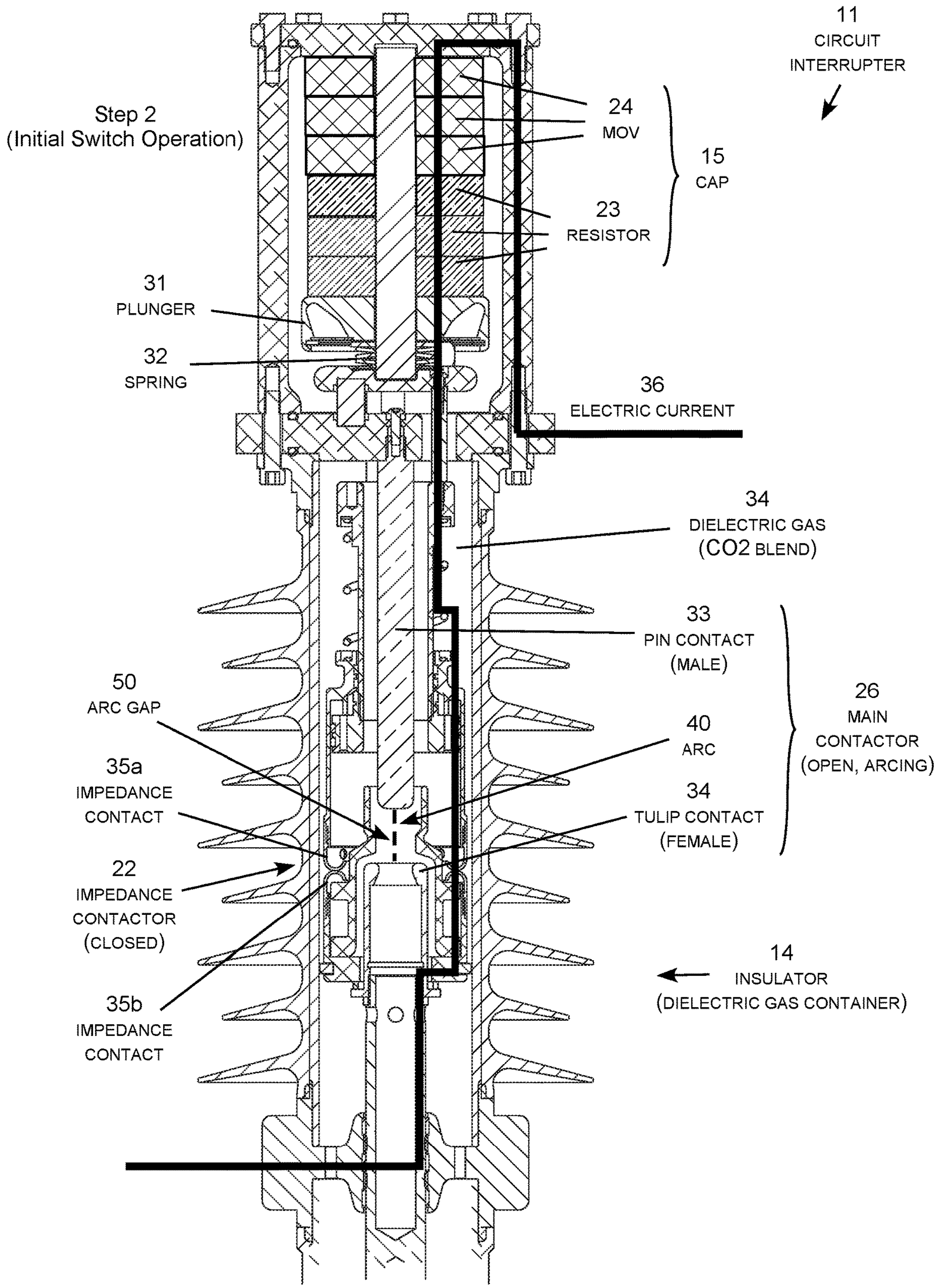
FIG. 4 is a cut-away side view showing the current path through the alternative gas current pause circuit interrupter in the initial switched configuration.

FIG. 4 is a cut-away side view showing the current path through the normally closed alternative gas current pause circuit interrupter 11 in the initial switched configuration. During the initial portion of the opening stroke, the pin contact 33 separates from the tulip contact 34 while the impedance contactor 22 remains closed. This causes an arc 40 to develop between the pin contact 33 and the tulip contact 34, which naturally extinguishes at the first current zero crossing after contact separation. As the voltage builds after the first current zero, a first restrike occurs while the pin contact 33 and the tulip contact 34 are sufficiently close to each other to prevent significant voltage disturbance from the restrike or flashover at a location other than the main contactor. The first restrike occurs below the clipping voltage of the MOV 24 due to the relatively short physical distance between the main contacts 33, 34 at the time of the first restrike. The arc formed by the first restrike extinguishes naturally at the ensuing current zero crossing. This process may repeat for a second restrike, which also occurs at a relatively low voltage below the clipping voltage of the MOV 24, due to a sufficiently short physical distance between the main contacts 33, 34. A third restrike, on the other hand, would occur at a higher voltage significantly increasing the electrical disturbance. In addition, the voltage rise required to reach a third restrike could potentially cause a flashover at a location other than across the main contactor 26, which could damage the interrupter.

To limit the voltage rise and prevent a third restrike across the main contactor 26, the clipping voltage of the MOV 24 is selected to be safely below the voltage across the main contacts 33, 34 required to cause a third restrike. As a result, the MOV 24 switches to a conducting mode, allowing the electric current to flow through the shunt leg 21 before a third restrike can occur, which limits the voltage rise between the main contacts 33, 34 effectively extinguishing the arc across the main contacts. In addition, the shunt leg 21 includes the resistor 23, which limits the current through the shunt leg after the MOV 24 switches to the conducting mode. This allows the plain break butt type impedance contactor 22 to extinguish the current flowing through the shunt leg 21 without causing an excessive voltage disturbance or damage from excessive arcing resulting from interruption of the current across the impedance contactor 22.

Figure 5:
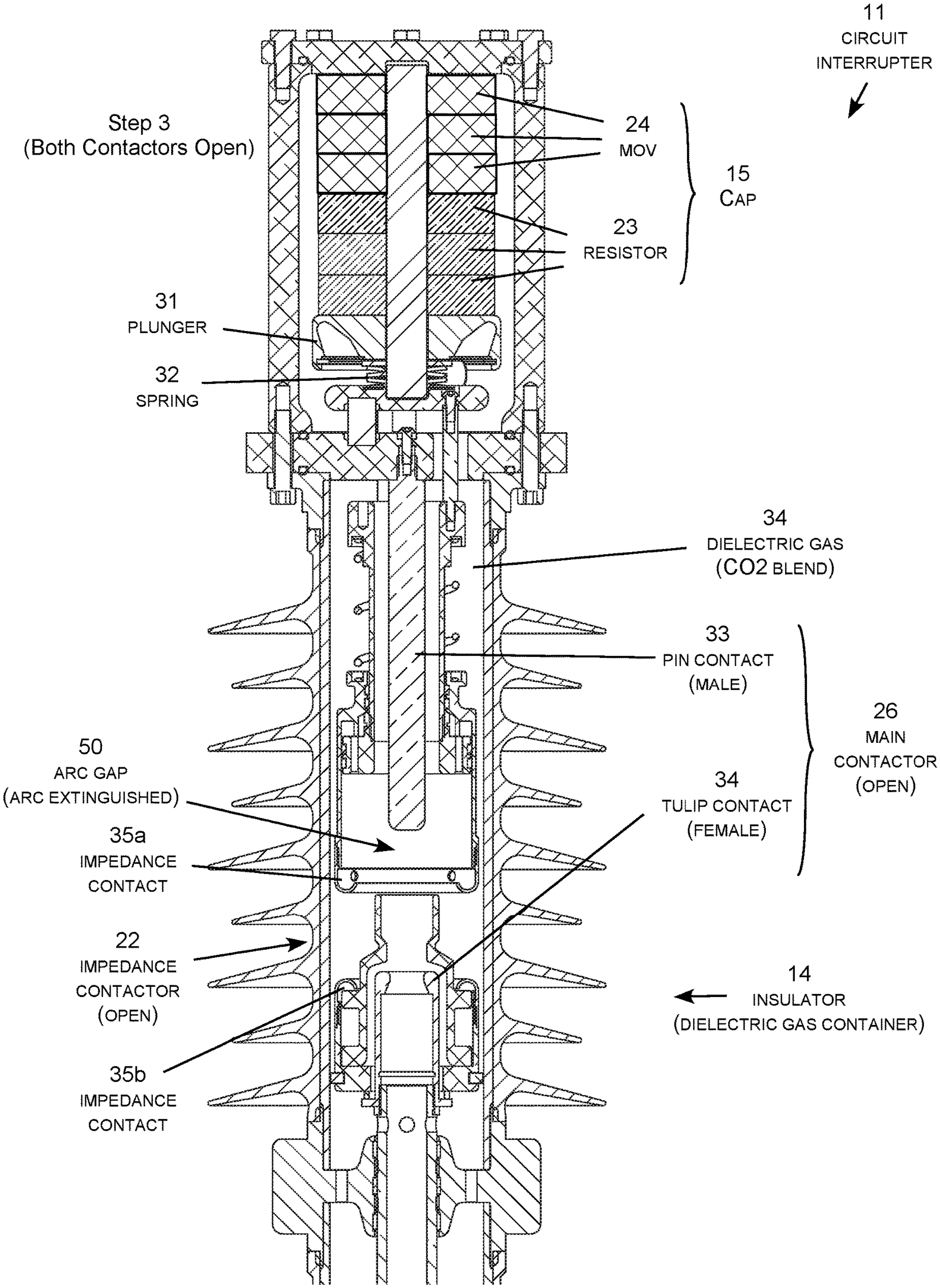
FIG. 5 is a cut-away side view showing there is no current flowing through the alternative gas current pause circuit interrupter in the open configuration.

FIG. 5 is a cut-away side view showing there is no current path through the alternative gas current pause circuit interrupter 11 in the open configuration after the impedance contactor 22 opens. After the MOV 24 has switched to the conductive mode, the resistor 23 limits the amount of current flowing through the shunt leg 21, allowing the plain break butt impedance contactor 22 to avoid excessive arcing when opening. The arc-extinguishing performance of the impedance contactor 22 is limited, however, by the dielectric performance of the alternative dielectric gas, which is significantly less than the conventional SF6 gas utilized in this type of gas interrupter. The dielectric gas ionizes to absorb then energy of an arc, which requires a recovery time to regain its dielectric performance after the main contactor restrikes. The alternate dielectric gas requires a longer recovery time than the conventional SF6 gas, which presents a design tradeoff between faster switch operation desired to avoid a third restrike at the main contactor 26, and a slower switch operation desired to give the alternate dielectric gas a longer recovery time, which complicates the design of the circuit interrupter 11. To avoid undesired arcing across the impedance contactor 22, the values of the resistor 23 and the MOV 24 are carefully selected to generate a "current pause" in the current through the shunt leg 21, while the MOV is in a non-conducting mode, sufficient to allow the alternative dielectric gas sufficient time to recover its dielectric performance. The values of the resistor 23 and the MOV 24 have to be selected carefully in view of the physical acceleration of the circuit interrupter, the number of restrikes allowed across the main contactor 26, and the recovery time of the alternative dielectric gas required to achieve the desired performance of the plain break butt type impedance contactor 22.

To provide an illustrative example, the rated voltage of the representative switch 10 shown in FIGS. 3-5 is 38 kV, which is a typical operating voltage for this type of gas circuit interrupter. The inventors have determined that, even at higher operating voltages up to 245 kV, the resistor 23 and the MOV 24 can be selected to produce an extended "current pause" flowing through the shunt leg 21 to allow a sufficient recovery time for the alternative dielectric gas for a plain break butt type impedance contactor 22 to be utilized, while also preventing a third restrike at the main contactor 26. More specifically, the resistor 23 and the MOV 24 can be selected to produce a current pause with less than 10% of the rated current flowing for at least 15% of the half-cycle time (1.3 ms at 60 Hertz), which has been found sufficient to allow a plain break butt type impedance contactor 22 to be utilized. In many cases, the resistor-varistor values can be selected to produce a current pause with less than 5% of the rated current flowing for at least 20% of the half-cycle time (1.7 ms at 60 Hertz). This allows the desired low electric disturbance performance to be achieved while utilizing a plain break butt type impedance contactor in the present of the alternative lower dielectric gas, which produces a lower cost circuit interrupter without making the physical structure of the circuit interrupter significantly larger than a SF6 gas interrupter for the same operating voltage.

In this particular 38 kV example, the resistor 23 consists of three carbon blend ceramic pucks one inch (2.5 cm) thick and three inches (7.6 cm) in diameter with a half-inch (1.3 cm) hole in the center exhibiting a combined resistance in the range of 800 to 1200 Ohms. The MOV 24 consists of three zinc-oxide pucks, which are also one inch (2.5 cm) thick and three inches (7.6 cm) in diameter with a half-inch (1.3 cm) hole in the center. The MOV clipping voltage approaches 12 kV, which is about a third of the 38 kV rated voltage. Pucks can be added or removed to adjust the resistance and the MOV clipping voltage. Pucks with different resistance or clipping voltages can also be selected to limit the number of pucks required to achieve the desired resistance and clipping voltage values. In addition, the overall configuration can be readily scaled up or down to create alternate gas current pause circuit interrupters from 15 kV to 245 kV with the desired performance characteristic.

Figure 6A:
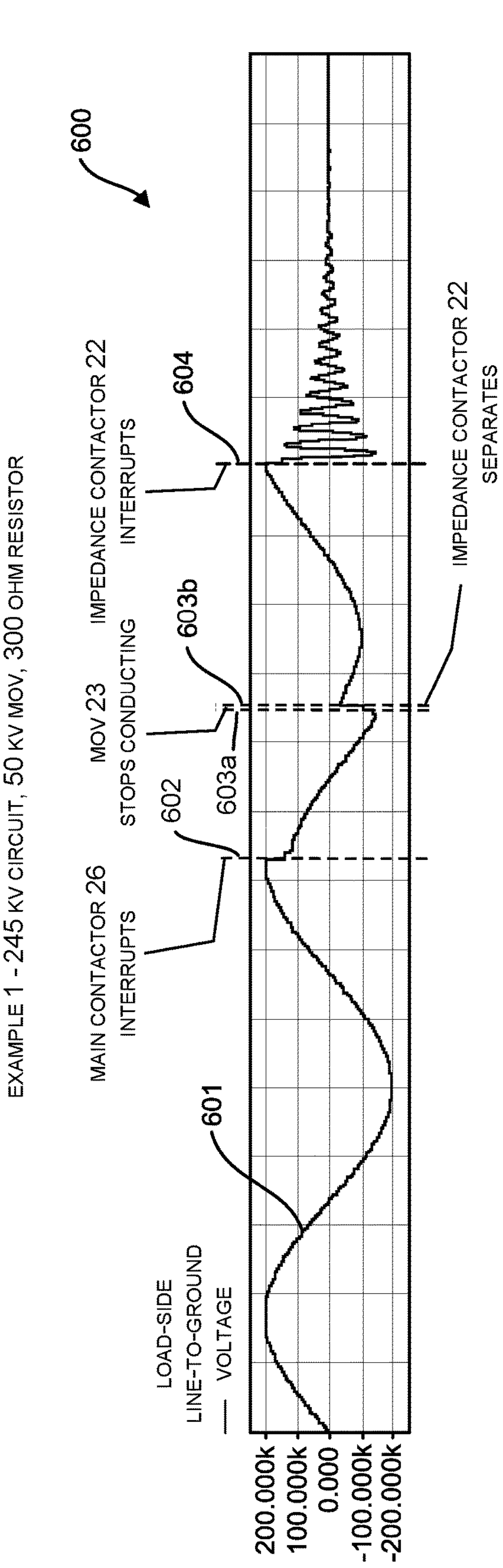
FIG. 6A is voltage graph of a first example of the normally closed alternative gas current pause circuit interrupter.

FIG. 6A is a load-side line-to-ground voltage graph 601 simulation of a first example of the normally closed alternative gas current pause circuit interrupter. The first example is a 245 kV circuit interrupter with a peak line-to-ground phase voltage about 200 kV, a 300 Ohm resistor, and a 50 kV varistor (MOV). The load voltage is plotted on the vertical axis versus time on the horizontal axis for a 60 Hertz system. Prior to time 602, the main contactor 26 conducts almost the full line current with virtually no voltage drop. At time 602, the main contactor 26 interrupts the line current, while withstanding the line voltage and diverting the electric current to the shunt leg 21, which causes a sharp voltage increase across the varistor 24. At time 603*a*, the varistor voltage drops below its clipping voltage and switches to a non-conducting mode. Shortly after time 603*a*, at time 603*b*, the varistor reaches its clipping voltage and switches to a conducting mode, which allows current to flow through the shunt leg 21. After time 603*b*, the impedance contactor 22 physically separates but continues to conduct electric current until a current zero crossing at a sufficient separation distance to prevent a restrike across the impedance contactor 22 at time 604. A significant transient voltage disturbance less than the rated voltage follows interruption of the current across the impedance contactor 22 at time 604.

Figure 6B:
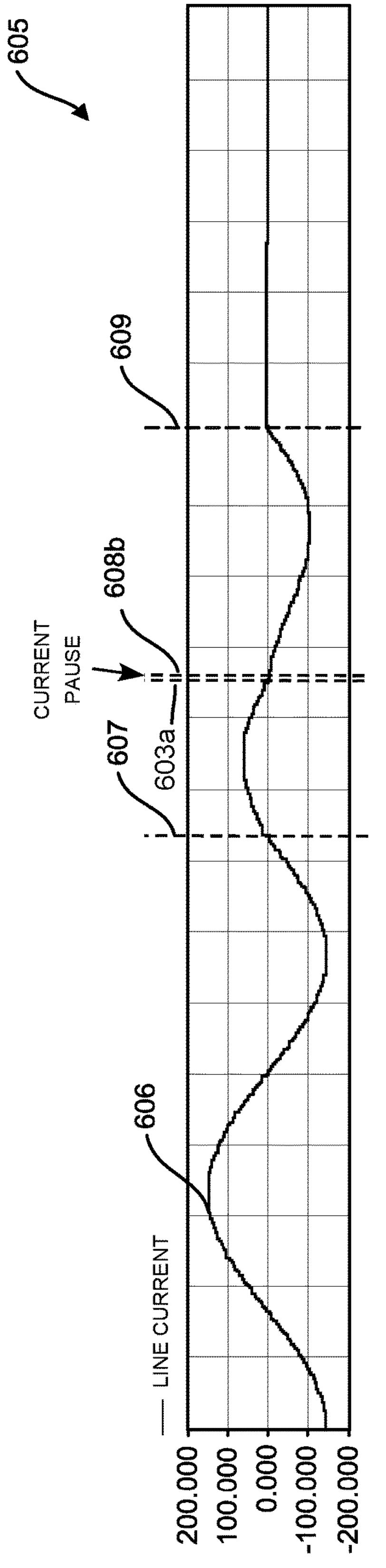
FIG. 6B is current graph of a first example of the normally closed alternative gas current pause circuit interrupter.

FIG. 6B is a line current graph 606 for the first example. In this example, a relatively short current pause occurs during the period from 603*a* to 603*b* after the main contactor interrupts and before the MOV 24 switches to a conducting mode. The alternative dielectric gas in the interrupter would have a greater opportunity to recover its dielectric capability, and further reduce the electric disturbance, if the current pause during the period from 603*a* to 603*b* could be extended. This is accomplished, as described below, in the second example interrupter.

Figure 7A:
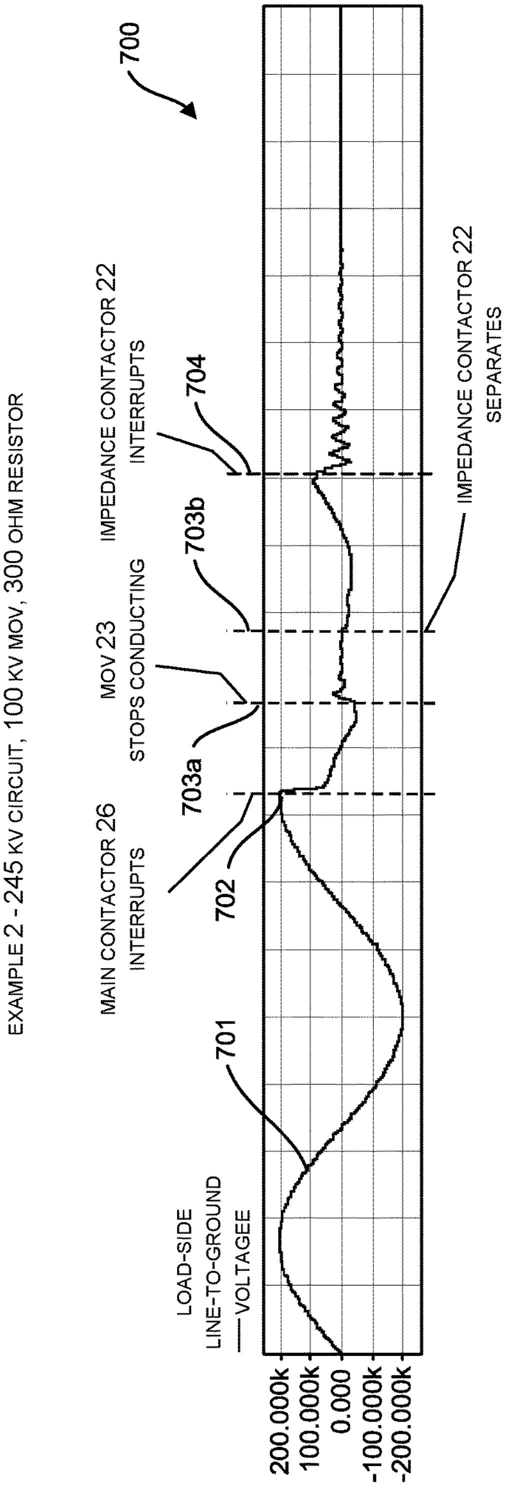
FIG. 7A is voltage graph of a second example of the normally closed alternative gas current pause circuit interrupter.

FIG. 7A is a load-side line-to-ground voltage graph 701 simulation of a second example of the normally closed alternative gas current pause circuit interrupter. The second example is the 245 kV circuit interrupter with a 300 Ohm resistor and a 100 kV varistor (MOV). That is, the clipping voltage rating of the varistor has been increased from 50 kV (about 20% of the rated system voltage) to 100 kV (about 40% of the rated system voltage). At time 702, the main contactor 26 interrupts. Shortly after the main contactor 26 interrupts, at time 703*a*, the MOV 24 switches to a non-conductive mode. The MOV 24 remains in the non-conductive mode until time 708*b* when it reaches its clipping voltage and switches to a conducting mode, which limits the voltage rise across the main contactor 26 to prevent another restrike across the main contactor. The current pause in the region from 708*a*-708*b* is caused by the MOV 24 remaining non-conductive mode for an extended period effectively blocking the current from flowing through the shunt leg 21 until the voltage across the MOV increases to the varistor clipping voltage causing it to switch to the conductive mode and allow current to flow through the shunt leg 21. After time 703*b*, the impedance contactor 22 physically separates but continues to conduct electric current until a current zero crossing at a sufficient separation distance to prevent restrike across the impedance contactor 22 at time 704. A transient voltage disturbance less than 10% of the rated voltage follows complete current interruption at time 704. The current pause is much longer and the transient voltage disturbance is much smaller than the transient voltage disturbance following time 604 in the first example in FIG. 6B.

Figure 7B:
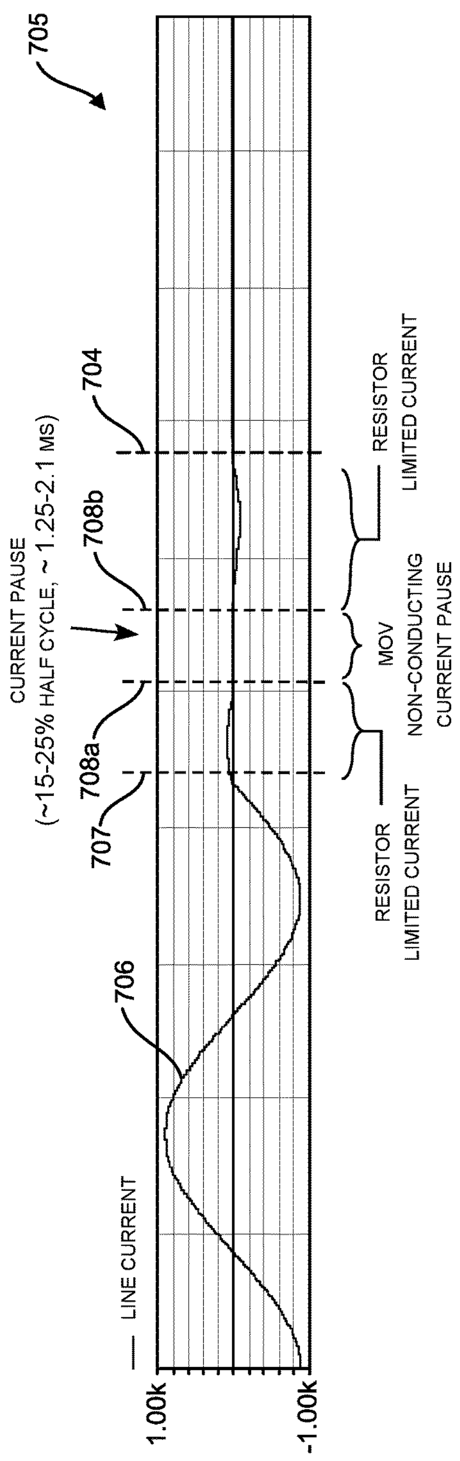
FIG. 7B is current graph of a second example of the normally closed alternative gas current pause circuit interrupter.

FIG. 7B is a line current graph 706, corresponding to the current on the power line for the second example. In the second example, the varistor remains in the non-conducting mode significantly longer than in the first example (i.e., the period from 703*a* to 703*b* in example 2 is significantly longer than the period from 603*a* to 603*b* in example 1). As a result, the duration of the current pause during the varistor non-conductive phase in example 2 is significantly longer than the current pause in example 1, affording the alternative dielectric gas a longer time to recover from ionization caused by the restrikes across the main contactor 26. In example 2, the current pause with a current well below 10% of the rated current has increased to over 15% of the half-cycle duration (over 1.3 ms at 60 Hertz). The inventors have determined that for most operating voltages, circuit interrupters with 60% CO2 dielectric gas can typically be designed to achieve current pauses of less than 5% percent of the of the rated current for at least 20% of the half-cycle duration (1.7 ms at 60 Hertz). As a result, the alternate gas interrupters exhibit equivalent circuit interrupting capability compared to their similarly sized SF6 counterparts.

Figure 8A:
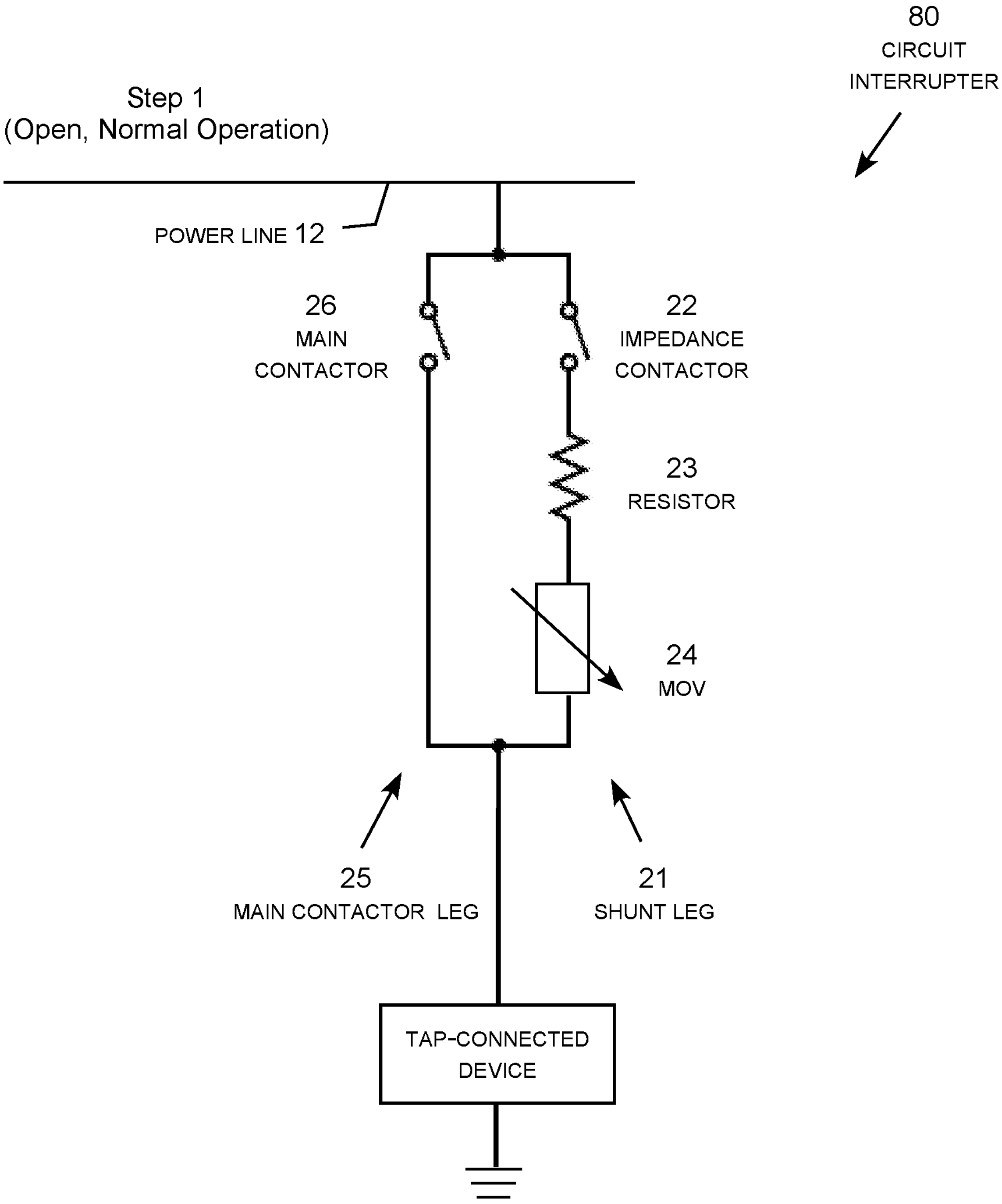
FIG. 8A is an electrical one-line diagram illustrating a normally open alternative gas current pause circuit interrupter as in a closed normal operating configuration.
Figure 8B:
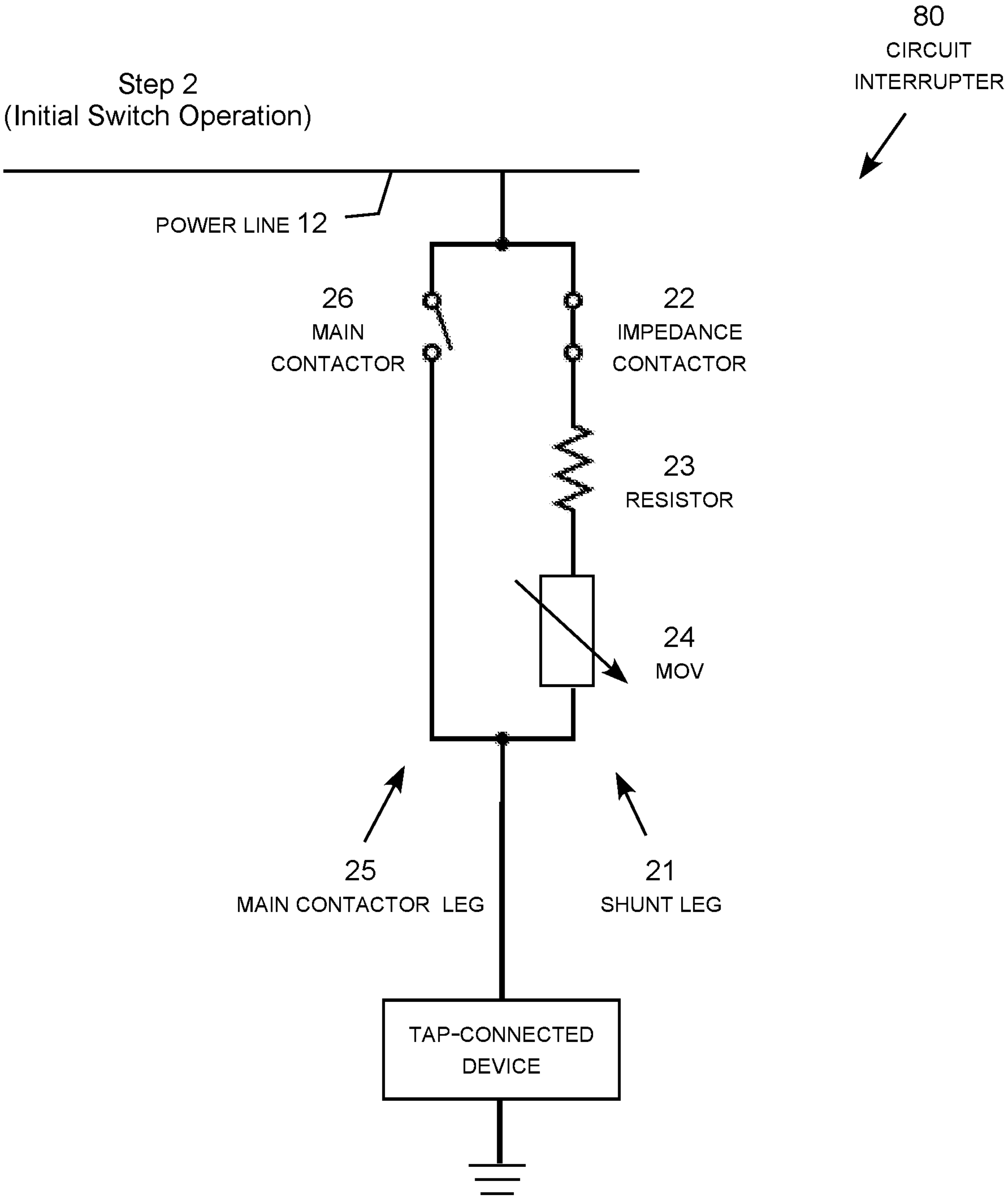
FIG. 8B is an electrical one-line diagram illustrating the normally open alternative gas current pause circuit interrupter in an initial switched configuration.
Figure 8C:
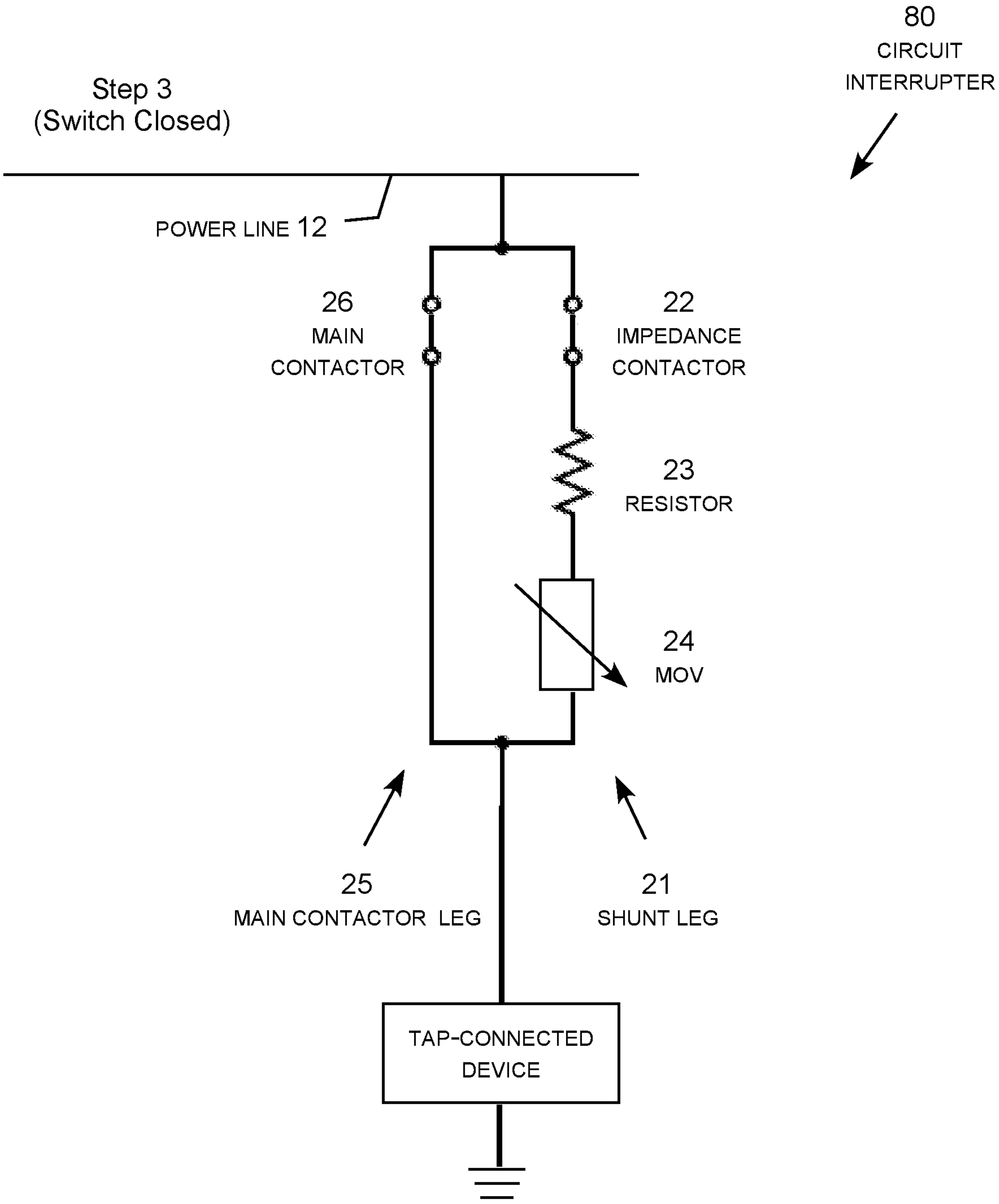
FIG. 8C is an electrical one-line diagram illustrating the normally open alternative gas current pause circuit interrupter in an open configuration.

It should also be appreciated that examples described above utilize the alternative gas current pause circuit interrupter 11 in a normally closed inline (series) connection suitable for use as line switch. The same type of circuit interrupter with the switch timing changed to switch the impedance contactor before the main contactor can be utilized in a normally open shunt (parallel) connection typically used for a capacitor switch. FIGS. 8A-8C are electrical one-line diagrams illustrating a shunt connected, normally open alternative gas current pause circuit interrupter 80. The normally open interrupter 80 can be largely identical to its normally closed counterpart 11 with the switch timing changed so that the impedance contactor closes momentarily before the main contactor. Once the normally open interrupter 80 switches to the closed position, it becomes essentially the same as the normally closed interrupter 11 when opening to disconnect. Since multiple restrikes are of greater concern when the circuit interrupter is opening due to the increasing physical distance between the contacts during the opening stroke, avoiding second or third restrikes during the opening stroke presents the more difficult design challenge. An interrupter designed to operate with a desired restrike limit on the opening stroke can therefore be readily designed to operate properly on the closing strike with the contactor timing changed to close the shut contactor before the main contactor. Embodiments of the invention include the normally closed configuration in which the main contactor opens before the impedance contactor, the normally open configuration in which the impedance contactor closes before the impedance contactor, and a bidirectional interrupter configuration in which the main contactor opens before the impedance contactor during the opening stroke, whereas the impedance contactor closes before the main contactor during the closing stroke.

The drawings are in simplified form and are not to precise scale unless specifically indicated. The words “couple” and similar terms do not necessarily denote direct and immediate connections, but also include connections through intermediate elements or devices. Certain descriptors, such “first” and “second,” “top and bottom,” “upper” and “lower,” “inner” and “outer,” or similar relative terms may be employed to differentiate structures from each other. These descriptors are utilized as a matter of descriptive convenience and are not employed to implicitly limit the invention to any particular position or orientation. It will also be understood that specific embodiments may include a variety of features and options in different combinations, as may be desired by different users. Practicing the invention does not require utilization of all, or any particular combination, of these specific features or options.

This disclosure sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively “associated” such that the desired functionality is achieved. Hence, any two components may be combined to achieve a particular functionality can be seen as “associated with” each other such that the desired functionality is achieved, irrespective of architectures or intermediate components. Likewise, any two components so associated can also be viewed as being “connected”, or “coupled”, to each other to achieve the desired functionality, and any two components capable of being so associated can also be viewed as being “functionally connected” to each other to achieve the desired functionality. Specific examples of functional connection include but are not limited to physical connections and/or physically interacting components and/or wirelessly communicating and/or wirelessly interacting components and/or logically interacting and/or logically interacting components.

In view of the foregoing, it will be appreciated that present invention provides significant improvements in electric power circuit interrupters utilizing an alternative, more environmentally friendly dielectric gas. The foregoing relates only to the exemplary embodiments of the present invention, and that numerous changes may be made therein without departing from the spirit and scope of the invention as defined by the following claims.

The invention claimed is:

1. An electric power circuit interrupter for a power line conducting electricity characterized by a rated voltage, a rated current, and a half-cycle period, comprising:

an insulator comprising a container filled with a dielectric gas excluding sulfur hexafluoride housing an electric power switch comprising a main contactor and an impedance contactor;

terminals connecting the electricity from the power line through the electric power switch;

a cap positioned adjacent to an end of the insulator housing a resistor and a varistor, wherein the impedance contactor, the resistor, and the varistor are electrically connected in series forming a shunt leg electrically connected in parallel with a main contactor leg comprising the main contactor;

an actuator for driving the electric power switch through an opening stroke to open the main contactor before the impedance contactor to disconnect the electricity flowing through the electric power switch;

the opening stroke causing at most two current restrikes to occur across the main contactor followed by a current pause in the shunt leg for recovery of the dielectric gas from the at most two current restrikes, the current pause comprising an electric current less than 10% of the rated current for a duration of at least 15% of the half-cycle period.

2. The electric power circuit interrupter of claim 1, wherein the current pause comprises an electric current less than 5% for a duration of at least 20% of the half-cycle period.

3. The electric power circuit interrupter of claim 1, wherein the dielectric gas comprises at least 60% carbon dioxide.

4. The electric power circuit interrupter of claim 1, wherein the main contactor comprises a penetrating pin-and-tulip contactor.

5. The electric power circuit interrupter of claim 1, wherein the main contactor comprises a puffer contactor.

6. The electric power circuit interrupter of claim 1, wherein the impedance contactor comprises a plain break butt contactor.

7. The electric power circuit interrupter of claim 1, wherein the resistor comprises a plurality of resistor disks positioned around a common core.

8. The electric power circuit interrupter of claim 1, wherein the varistor comprises a plurality of zinc oxide disks positioned around a common core.

9. The electric power circuit interrupter of claim 1, further comprising a spring biasing the resistor and varistor against an end of the cap.

10. The electric power circuit interrupter of claim 1, wherein a voltage disturbance less than the rated voltage follows current interruption through the impedance contactor.

11. The electric power circuit interrupter of claim 1, wherein a voltage disturbance less than 10% of the rated voltage follows current interruption through the impedance contactor.

12. An electric power circuit interrupter for a power line conducting electricity characterized by a rated voltage, a rated current, and a half-cycle period, comprising:

an insulator comprising a container filled with a dielectric gas comprising at least 60% carbon dioxide housing an electric power switch comprising a puffer type pin-and-tulip main contactor and a plain break butt impedance contactor;

terminals connecting the electricity from the power line through the electric power switch;

a cap positioned adjacent to an end of the insulator housing a plurality of resistor disks and a plurality of varistor disks positioned around a common core, wherein the impedance contactor, the resistor, and the varistor are electrically connected in series forming a shunt leg electrically connected in parallel with a main contactor leg comprising the main contactor;

an actuator for driving the electric power switch through an opening stroke to open the main contactor before the impedance contactor to disconnect the electricity flowing through the electric power switch;

the opening stroke causing at most two current restrikes to occur across the main contactor followed by a current pause in the shunt leg for recovery of the dielectric gas from the at most two current restrikes, the current pause comprising an electric current less than 10% of the rated current for a duration of at least 15% of the half-cycle period.

13. The electric power circuit interrupter of claim 12, further comprising a spring biasing the resistor and varistor against an end of the cap.

14. The electric power circuit interrupter of claim 12, wherein the current pause comprises an electric current less than 5% for a duration of at least 20% of the half-cycle period.

15. The electric power circuit interrupter of claim 12, wherein a voltage disturbance less than the rated voltage follows current interruption through the impedance contactor.

16. The electric power circuit interrupter of claim 12, wherein a voltage disturbance less than 10% of the rated voltage follows current interruption through the impedance contactor.

17. An electric power circuit interrupter for a power line conducting electricity characterized by a rated voltage, a rated current, and a half-cycle period, comprising:

an insulator comprising a container filled with a dielectric gas excluding sulfur hexafluoride housing an electric power switch comprising a main contactor and an impedance contactor;

terminals connecting the electricity from the power line through the electric power switch;

a cap positioned adjacent to an end of the insulator housing a resistor and a varistor, wherein the impedance contactor, the resistor, and the varistor are electrically connected in series forming a shunt leg electrically connected in parallel with a main contactor leg comprising the main contactor;

an actuator for driving the electric power switch through an opening stroke to open the main contactor before the impedance contactor to disconnect the electricity flowing through the electric power switch;

the opening stroke causing at most two current restrikes to occur across the main contactor followed by a current pause in the shunt leg for recovery of the dielectric gas from the at most two current restrikes, the current pause comprising an electric current less than 10% of the rated current for a duration of at least 15% of the half-cycle period wherein a voltage disturbance less than the rated voltage follows current interruption through the impedance contactor.

18. The electric power circuit interrupter of claim 17, wherein the current pause comprises an electric current less than 5% for a duration of at least 20% of the half-cycle period.

19. The electric power circuit interrupter of claim 17, wherein a voltage disturbance less than 10% of the rated voltage follows current interruption through the impedance contactor.

20. The electric power circuit interrupter of claim 17, wherein the dielectric gas comprises at least 60% carbon dioxide.

* * * * *